(12) United States Patent
Volkov et al.

(10) Patent No.: US 11,410,364 B2
(45) Date of Patent: Aug. 9, 2022

(54) SYSTEMS AND METHODS FOR REALISTIC HEAD TURNS AND FACE ANIMATION SYNTHESIS ON MOBILE DEVICE

(71) Applicant: SNAP INC., Santa Monica, CA (US)

(72) Inventors: Yurii Volkov, Saint-Petersburg (RU); Pavel Savchenkov, Sochi (RU); Maxim Lukin, Sochi (RU); Ivan Belonogov, Perm (RU); Nikolai Smirnov, Sochi (RU); Aleksandr Mashrabov, Sochi (RU)

(73) Assignee: Snap Inc., Santa Monica, CA (US)

( * ) Notice: Subject to any disclaimer, the term of this patent is extended or adjusted under 35 U.S.C. 154(b) by 232 days.

(21) Appl. No.: 16/662,743

(22) Filed: Oct. 24, 2019

(65) Prior Publication Data
US 2020/0234480 A1    Jul. 23, 2020

Related U.S. Application Data

(63) Continuation-in-part of application No. 16/509,370, filed on Jul. 11, 2019, which is a continuation-in-part of application No. 16/251,436, filed on Jan. 18, 2019, now Pat. No. 10,789,453.

(60) Provisional application No. 62/892,562, filed on Aug. 28, 2019.

(51) Int. Cl.
*G06T 13/40* (2011.01)
*G06T 7/70* (2017.01)
*G06V 40/16* (2022.01)

(52) U.S. Cl.
CPC ............ *G06T 13/40* (2013.01); *G06T 7/70* (2017.01); *G06V 40/165* (2022.01); *G06T 2207/20081* (2013.01); *G06T 2207/20084* (2013.01); *G06T 2207/20132* (2013.01)

(58) Field of Classification Search
CPC .. G06K 9/00228; G06K 9/00302; G06N 3/04; G06Q 30/0254; G06Q 30/0269; G06T 11/001
See application file for complete search history.

(56) References Cited

U.S. PATENT DOCUMENTS

2016/0078280 A1* 3/2016 Tai .......................... G06T 13/80
382/118

OTHER PUBLICATIONS

Olszewski et al: "High-Fidelity Facial and Speech Animation for VR HMDs", ACM, 2016 (Year: 2016).*

(Continued)

*Primary Examiner* — Ruiping Li
(74) *Attorney, Agent, or Firm* — Georgiy L. Khayet

(57) ABSTRACT

Provided are systems and methods for realistic head turns and face animation synthesis. An example method may include receiving frames of a source video with the head and the face of a source actor. The method may then proceed with generating sets of source pose parameters that represent positions of the head and facial expressions of the source actor. The method may further include receiving at least one target image including the target head and the target face of a target person, determining target identity information associated with the target face, and generating an output video based on the target identity information and the sets of source pose parameters. Each frame of the output video can include an image of the target face modified to mimic at least one of the positions of the head of the source actor and at least one of facial expressions of the source actor.

16 Claims, 14 Drawing Sheets

(56) References Cited

OTHER PUBLICATIONS

Cao, et al: "3D Shape Regression for Real-time Facial Animation", 2013 (Year: 2013).*
Justus Thies et al: "Real-time expression transfer for facial reenactment", ACM Transactions on Graphics, ACM, NY, US, vol. 34, No. 6, Oct. 26, 2015 (Oct. 26, 2015), pp. 1-14, XP058075297, ISSN: 0730-0301, DOI: 10.1145/2816795.2818056 sect. 1-5.
Lu Zhihe et al: "Recent Progress of Face Image Synthesis", 2017 4th IAPR Asian Conference on Pattern Recognition (ACPR), IEEE, Nov. 26, 2017 (Nov. 26, 2017), pp. 7-12, XP033475222, DOI: 10.1109/ACPR.2017.2 [retrieved on Dec. 13, 2018] the whole document.
Wissam J Baddar et al: "Dynamics Transfer GAN: Generating Video by Transferring Arbitrary Temporal Dynamics from a Source Video to a Single Target Image", arxiv.org, Cornell University Library, 201 Olin Library Cornell University Ithaca, NY 14853, Dec. 10, 2017 (Dec. 10, 2017), XP080841580, sect.3 and 4.

* cited by examiner

SYSTEMS AND METHODS FOR REALISTIC HEAD TURNS AND FACE ANIMATION SYNTHESIS ON MOBILE DEVICE

CROSS-REFERENCE TO RELATED APPLICATION

This application claims the benefit of U.S. provisional patent application Ser. No. 62/892,562, entitled "Realistic Head Turns and Face Animation Synthesis on Mobile Device," filed on Aug. 28, 2019. This application is a Continuation-in-part of U.S. patent application Ser. No. 16/509,370, entitled "Text and Audio-Based Real-Time Face Reenactment," filed on Jul. 11, 2019, which is a Continuation-in-part of U.S. patent application Ser. No. 16/251,436, entitled "Systems And Methods For Face Reenactment," filed on Jan. 18, 2019. The aforementioned applications are incorporated herein by reference in their entirety for all purposes.

TECHNICAL FIELD

This disclosure generally relates to digital image processing. More particularly, this disclosure relates to realistic head turns and face animation synthesis on mobile devices.

BACKGROUND

Face animation synthesis may include transferring a facial expression of a source individual in a source video to a target individual in a target video or a target image. The face animation synthesis can be used for manipulation and animation of faces in many applications, such as entertainment shows, computer games, video conversations, virtual reality, augmented reality, and the like.

Some current techniques for face animation synthesis utilize morphable face models to re-render the target face with a different facial expression. While generation of a face with a morphable face model can be fast, the generated face may not be photorealistic. Some other current techniques for face animation synthesis are time-consuming and may not be suitable to perform a real-time face animation synthesis on regular mobile devices.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one embodiment of the disclosure, an example method for realistic head turns and face animation synthesis may include receiving, by a computing device, frames of a source video. The frames of the source video may include a head and a face of a source actor. The method may further include generating sets of source pose parameters by the computing device based on the frames of the source video. The source pose parameters may include at least one of: source key points corresponding to coordinates of facial landmarks of the source actor and parameters of a parametric facial expression model. The sets of the source pose parameters may represent positions of the head of the source actor and facial expressions of the source actor in the frames of the source video. The method may further include receiving, by the computing device, at least one target image. The at least one target image may include a target head and a target face of a target person. The target person may be different from the source actor. The method may further include determining target identity information associated with the target face of the target person based on the at least one target image. The determination of the target identity information may include providing the at least one target image to a neural network configured to output a real value vector representing the target identity information. The method may further include generating an output video by the computing device and based on the target identity information and the sets of source pose parameters. Each frame of the output video may include an image of the target face. The image of the target face can be modified based on at least one of the sets of the source pose parameters to mimic at least one of the positions of the head of the source actor and at least one of the facial expressions of the source actor. Each frame of the output video may be generated independently from the rest of the frames of the output video. At least one frame of the output video may be generated based on information extracted from at least one previously generated frame of the output video. The generation of the output video may include providing the target identity information and the sets of source pose parameters to a neural network configured to generate frames of the output video.

In an example embodiment, prior to the generation of the output video, the source pose parameters can be adjusted based on the target identity information. In a further example embodiment, prior to the generation of the output video, the source pose parameters representing the facial expressions in a pre-determined number of neighboring frames of the source video can be averaged. In yet another example embodiment, prior to the generation of the output video, at least one frame of the source video can be cropped based on the source pose parameters to obtain a further frame. An affine transformation for transforming the at least one frame to the further frame can be determined. After the generation of the output video, a further affine transformation can be applied to a frame of the output video corresponding to the at least one frame of the source video. The further affine transformation can be an inverse of the affine transformation.

According to another embodiment, a system for realistic head turns and face animation synthesis is provided. The system may include at least one processor and a memory storing processor-executable codes, wherein the at least one processor can be configured to implement operations of the above-mentioned method for realistic head turns and face animation synthesis upon execution of the processor-executable codes.

According to yet another aspect of the disclosure, there is provided a non-transitory processor-readable medium, which stores processor-readable instructions. When the processor-readable instructions are executed by a processor, they cause the processor to implement the above-mentioned method for realistic head turns and face animation synthesis.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION OF EXAMPLE EMBODIMENTS

Figure 1:
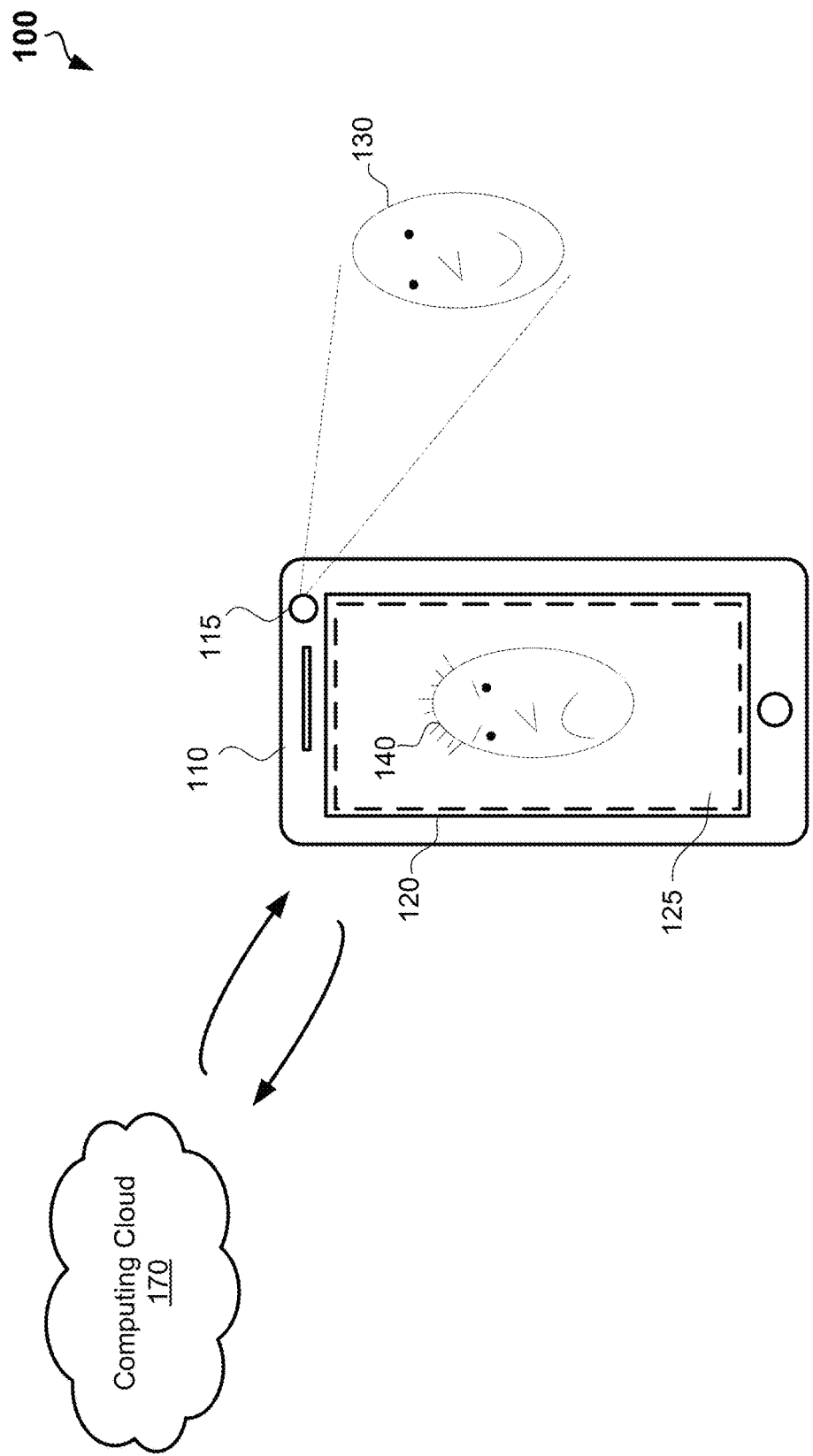
FIG. 1 is a block diagram showing an example environment wherein a method for realistic head turns and face animation synthesis can be implemented, according to an example embodiment.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

This disclosure relates to methods and systems for realistic head turns and face animation synthesis. The embodiments provided in this disclosure solve at least some issues of known art. The present disclosure can be designed to work on mobile devices, such as smartphones, tablet computers, or mobile phones, in real-time and without connection to the Internet or the need to use server-side computational resources, although the embodiments can be extended to approaches involving a web service or a cloud-based resource.

Some embodiments of the disclosure may allow taking a source video of a first person (hereinafter called "source actor") and setting target photos (or video) of a second person (hereinafter called "target actor") as an input, and synthesizing animation of the target actor with facial mimics and head movements of the source actor. In general, the methods and systems of the present disclosure make the target actor seem to come alive and mimic movements and facial expressions of the source actor. The methods and systems may be used in an entertainment type of mobile application where a user takes a selfie and chooses a scenario of animating the person and applying visual effects. The scenarios have different settings and source actor movements, which are transferred to the user selfie. The resulting video can feature the user in different situations and locations. The user can share the resulting video with his friends. The resulting video may be used as video stickers in messaging applications or social networking services.

The target face can be manipulated by facial expressions of the source face in real time by performing a real-time mimicking of positions of the head of the source actor and facial expressions of the source actor. Some embodiments may significantly reduce the computation time for generation of a target video in which a face of the target person mimics positions of the head of the source actor and facial expressions of the source actor and allow performing this generation of the target video on a mobile device.

The present disclosure can be implemented using a variety of technologies. For example, methods described herein can be implemented by software running on a computer system and/or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium. It should be noted that methods disclosed herein can be implemented by a computing device such as a mobile device, personal computer, server, network node, and so forth.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

According to one embodiment of the disclosure, an example method for realistic head turns and face animation synthesis can include receiving, by a computing device, frames of a source video. The frames of the source video can include a head and a face of a source actor. The method may further include generating sets of source pose parameters by the computing device based on the frames of the source video. The sets of the source pose parameters can represent positions of the head of the source actor and facial expressions of the source actor in the frames of the source video. The method can further include receiving, by the computing device, at least one target image. The at least one target image can include a target head and a target face of a target person. The target person can be different from the source actor.

The method can further include determining target identity information associated with the target face of the target person based on the at least one target image. The method can further include generating an output video by the computing device and based on the target identity information and the sets of source pose parameters. Each frame of the output video can include an image of the target face in at least one frame of the output video. The image of the target face can be modified based on at least one of the sets of the source pose parameters to mimic at least one of the positions of the head of the source actor and at least one of the facial expressions of the source actor.

According to another embodiment of the disclosure, an example method for realistic head turns and face animation synthesis may include receiving, by a computing device, a source video and frames of a source video. The frames of the source video may include a head and a face of a source actor. The method may further include generating sets of source key points by the computing device based on the frames of the source video. The sets of the source key points may represent positions of the head of the source actor and facial expressions of the source actor in the frames of the source video. The method may further include receiving a target video by the computing device. The target video may include a target head and a target face of a target person. The target person may be different from the source actor. The method may further include generating an output video by the computing device and based on the target video and the sets of source key points. Each frame of the output video may include an image of the target face. The image of the target face may be modified based on at least one of the sets of the source key points to mimic at least one of the positions of the head of the source actor and at least one of facial expressions of the source actor.

Referring now to the drawings, exemplary embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for realistic head turns and face animation synthesis can be practiced. The environment 100 may include a computing device 110, a user 130, and a cloud-based computing resource 170 (also referred to as a computing cloud 170). The computing device 110 may include a camera 115 and a graphical display system 120. The computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device. The computing device 110 can be communicatively connected to the computing cloud 170 via a data network. The cloud-based computing resource 170 can include computing resources (hardware and software) available at a remote location and accessible over a network (e.g., the Internet). The cloud-based computing resources can be shared by multiple users and can be dynamically re-allocated based on demand. The cloud-based computing resources can include one or more server farms/clusters including a collection of computer servers, which can be co-located with network switches and/or routers. In some embodiments of the disclosure, the computing device 110 can be configured to display a target video 125. The target video 125 may include at least one frame including a target face 140. In some embodiments, the target video 125 may include a single image. In some embodiments, the target video 125 can be pre-recorded and stored in a memory storage of the computing device 125 or in a cloud-based computing resource to which the computing device 125 is communicatively connected.

In certain embodiments, the computing device 110 may be configured to capture a source video, via, for example, the camera 115. The source video may include at least a face of user 130 (also referred as a source face). In some other embodiments, the source video can be stored in the memory storage of the computing device 110 or in the computing cloud 170.

In some other embodiments, several target videos or images can be pre-recorded and stored in the memory of the computing device 110 or in the computing cloud 170. A user may select the target video or an image to be manipulated and one of the source videos to be used to manipulate the target video or image. According to various embodiments of the disclosure, the computing device 110 can be configured to analyze the source video to extract parameters of facial expressions of user 130. The computing device 110 can be further configured to modify, based on the parameters of the facial expression of the source face, the target video 125 to make the target face 140 repeat a facial expression of the source face in real time. In further embodiments, the computing device 110 can be further configured to modify the target video 125 to make the target face 140 to repeat a speech of the user 130.

In some embodiments of the disclosure, the computing device may be configured to receive user input. The user input may include one or more scenarios indicating how to control facial parameters of the target face. The scenario may include a sequence of types of facial expressions and types of movements of the target face 140 that the user 130 wants to see in the modified target video 125. The user input may also include environmental variables indicating the types of computing devices (for example, mobile device or desktop) for generating the modified video.

In some further embodiments of the disclosure, the computing device 110 or the cloud-based computing resource 170 may store one or more images of the user 130. The images may include the face of the user 130. The images can also include a set of photographs or a set of videos taken under different conditions. For example, the photographs and videos can be taken from different angles with respect to the face of the user 130 and in different lighting conditions. In some embodiments, the computing device 110 or the computing cloud 170 may store one or more images of another individual (for example, a friend of the user 130 or a favorite celebrity of the user 130).

According to some embodiments of the disclosure, the computing device 110 or the cloud-based computing resource 170 can be configured to analyze the stored images of the user 130 in order to extract facial parameters of the user 130. The computing device 110 or the cloud-based computing resource 170 can be further configured to modify the target video 125 by replacing, based on the facial parameters of the user 130, the target face 140 in the target video 125 with the face of the user 130.

Figure 2:
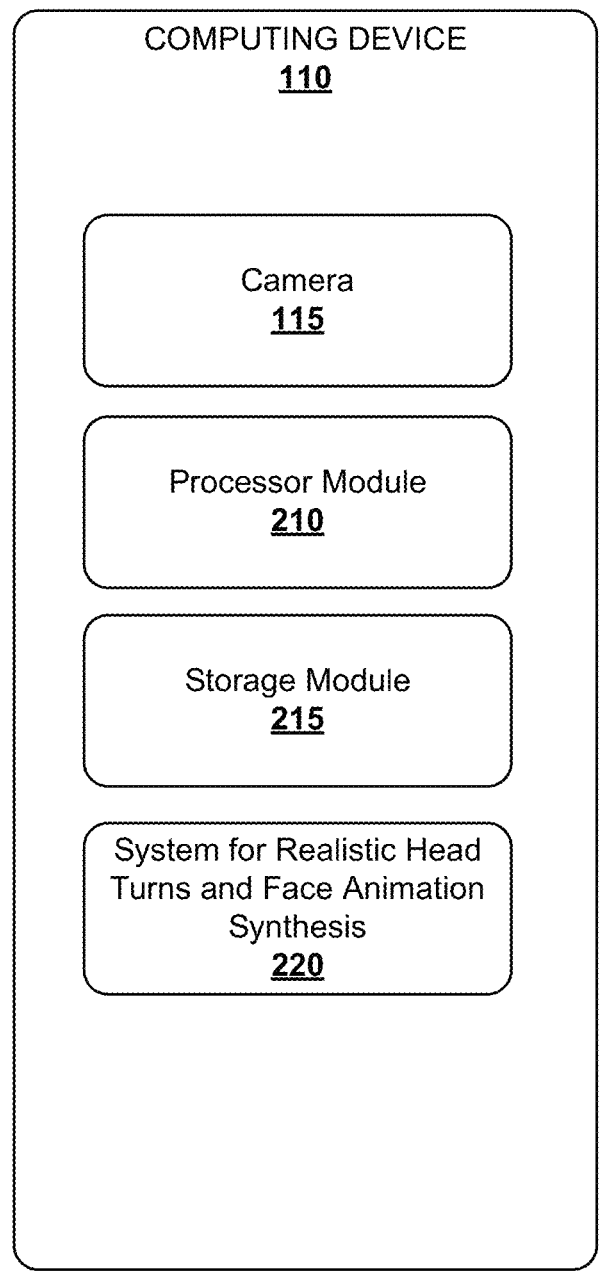
FIG. 2 is a block diagram showing an example embodiment of a computing device for implementing methods for realistic head turns and face animation synthesis, according to an example embodiment.

Similarly, the computing device 110 or the cloud-based computing resource 170 can be configured to analyze the stored images of the user 130 to extract facial parameters of another individual (for example, a friend of the user 130 or a favorite celebrity of the user 130). The computing device 110 can be further configured to modify the target video 125 by replacing, based on the facial parameters of the individual, the target face 140 in the target video 125 with the face of the individual. In some embodiments, the computing device 110 or the cloud-based computing resource 170 can be configured to keep a facial expression of the target face 140 unchanged while replacing the target face with the face of the user 130 or another individual. In the example shown in FIG. 2, the computing device 110 includes both hardware components and software components. Particularly, the computing device 110 includes the camera 115 or any other image-capturing device or scanner to acquire digital images. The computing device 110 can further include a processor module 210 and a storage module 215 for storing software components and processor-readable (machine-readable) instructions or codes, which when performed by the processor module 210, cause the computing device 200 to perform at least some steps of methods for realistic head turns and face animation synthesis as described herein.

The computing device 110 can further include a system 220 for realistic head turns and face animation synthesis, which, in turn, can include hardware components (e.g., a separate processing module and memory), software components, or a combination thereof. The system 220 for realistic head turns and face animation synthesis can be configured to perform realistic head turns and face animation synthesis as described herein. The system 220 for realistic head turns and face animation synthesis is described in more detail below with reference to FIG. 4.

Figure 3:
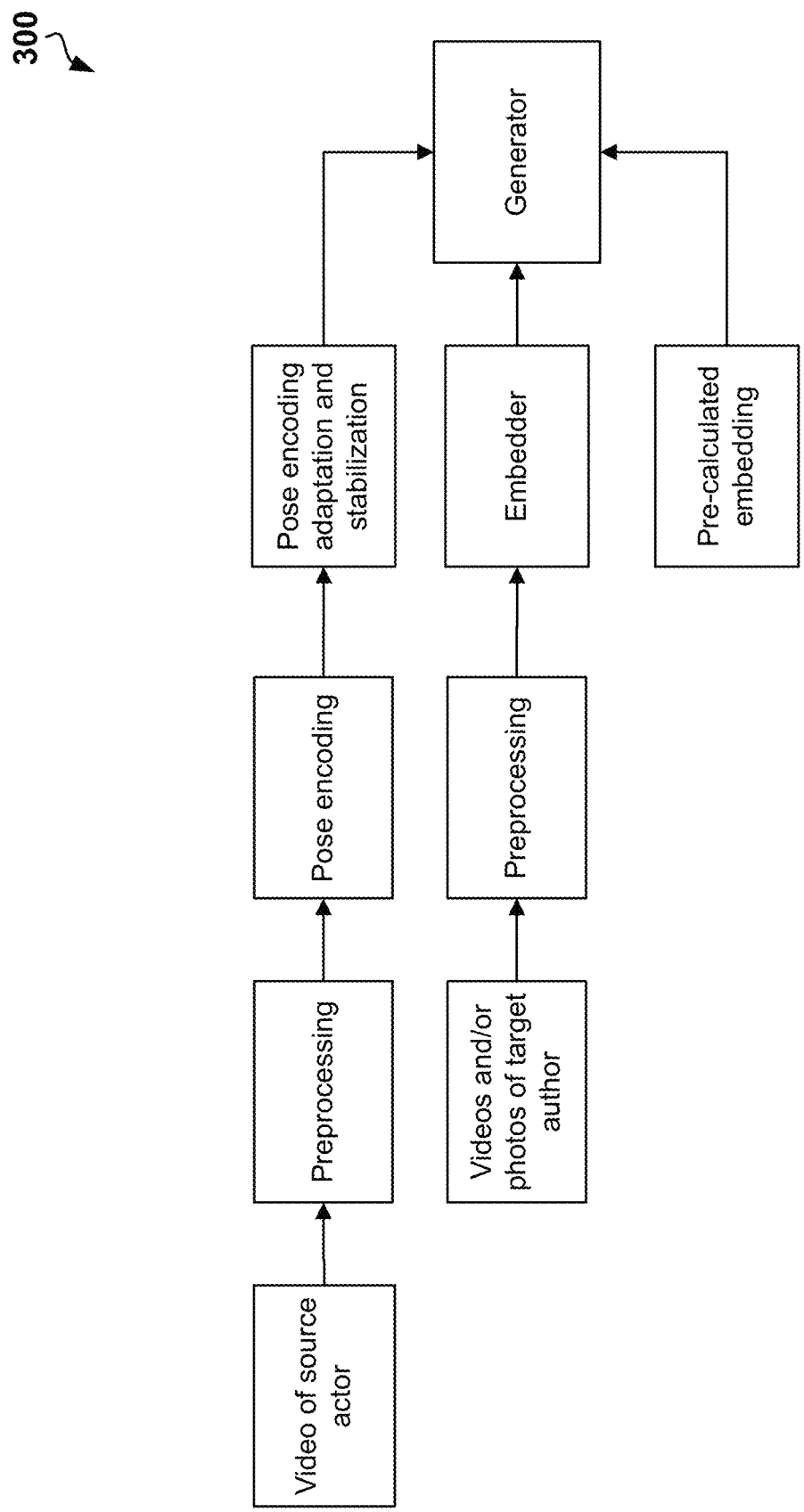
FIG. 3 is a block diagram showing steps performed by the system for realistic head turns and face animation synthesis during an inference stage, according to an example embodiment.
Figure 7:
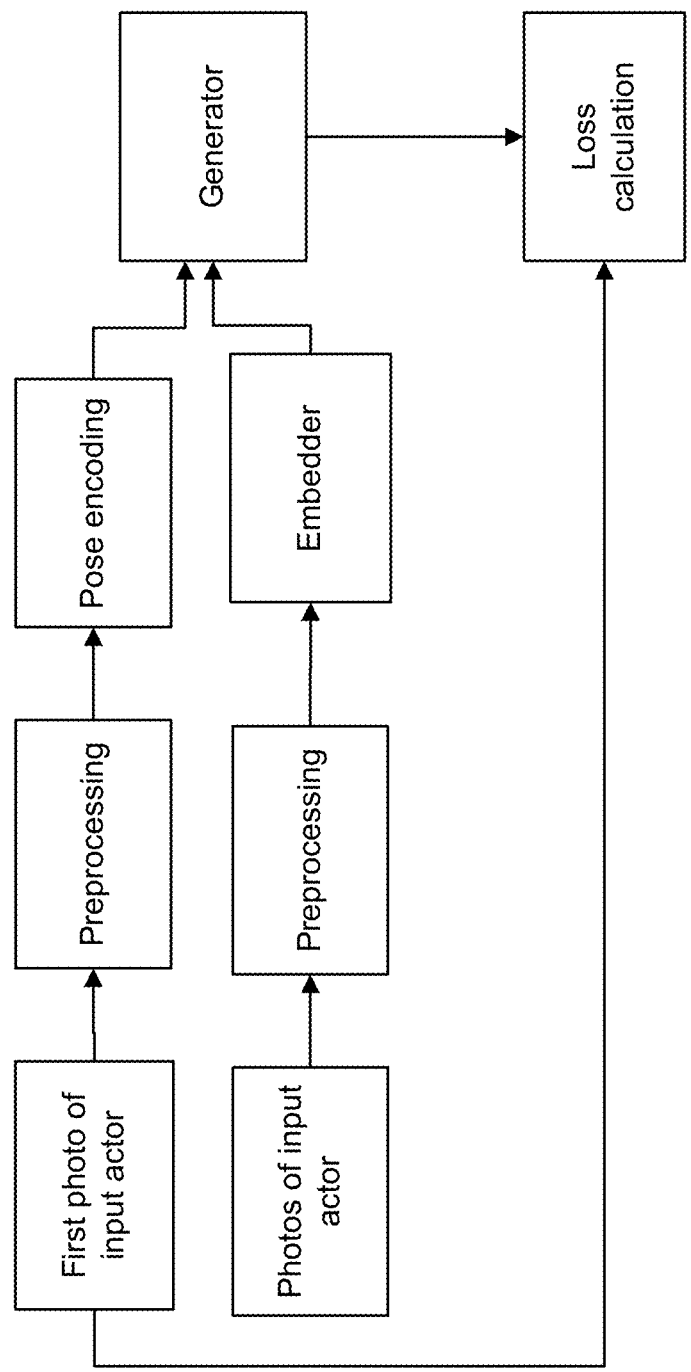
FIG. 7 is a block diagram showing steps performed by the system for realistic head turns and face animation synthesis during a training stage, according to an example embodiment.

The system 220 for realistic head turns and face animation synthesis includes machine learning models and is further described with reference to FIG. 3 illustrating an inference stage and FIG. 7 illustrating a training stage.

FIG. 3 is a block diagram showing steps performed by the system 220 for realistic head turns and face animation synthesis during the inference stage. The process of 'animated head' generation of a target actor may be separated into several stages:

1-Preprocess input videos and photos of source and target actors. The preprocessing may include not only image processing primitives such as resizing and cropping, but also more sophisticated techniques such as semantic segmentation and image warping.

2-Encode facial expressions and a head pose of a source actor. The encoding may include a sequence of facial key points at each frame or sequence of parameters of some parametric facial expression model. This encoding is hereinafter called "pose encoding."

3-(Optional) In some cases (e.g., facial landmarks), encoding calculated on previous step may include some identity information about a source actor, which is undesired and need to be removed. Thus, the optional step for the system is pose encoding adaptation. It means that identity information in pose encoding from the source actor is replaced to that of a target actor. Obviously, while doing this operation, other information contained in encoding (facial expression and head pose) is preserved. Also, in case of "frame-by-frame" generation strategy, the system enforces temporal coherence of encodings, so the system performs by pose encoding stabilization.

To replace the identity information in pose encoding, namely facial landmarks of the source actor to that of the target actor, convolutional Neural Network (NN) which operated on 2D images is trained. The convolutional NN is trained on synthetic data generated with 3D morphable model (3DMM).

4-Encode a target actor identity by using a model called "Embedder." The embedder outputs embedding based on a set of photos (or video) with a head of the target actor. Embedding can be represented by real valued one-dimensional vector, an image with target actor's face texture, or any other structure which contains information about the actor's identity. Each frame can be fed to the Embedder with one of two strategies: (a) independently so that the final embedding is calculated as some aggregation function of each output; (b) together so that it requires that the Embedder be capable of taking input of variable sizes.

5-Generate an 'animated head' of the target actor using a model called "Generator." A Generator takes identity embedding and pose encoding and generates target face movements. Generation can be done not only with "frame by frame" strategy (when next frame is generated independently from all previous) but also it may consider all previously generated frames while generating the next one. Moreover, a Generator may take as input a first approximation of a resulting image, which may be rendered with a 3DMM.

In some embodiments, identity embedding can be pre-calculated only one time and used for generation of all frames. This may allow avoiding use of "Embedder" each time when the "Generator" generates a frame.

Figure 4:
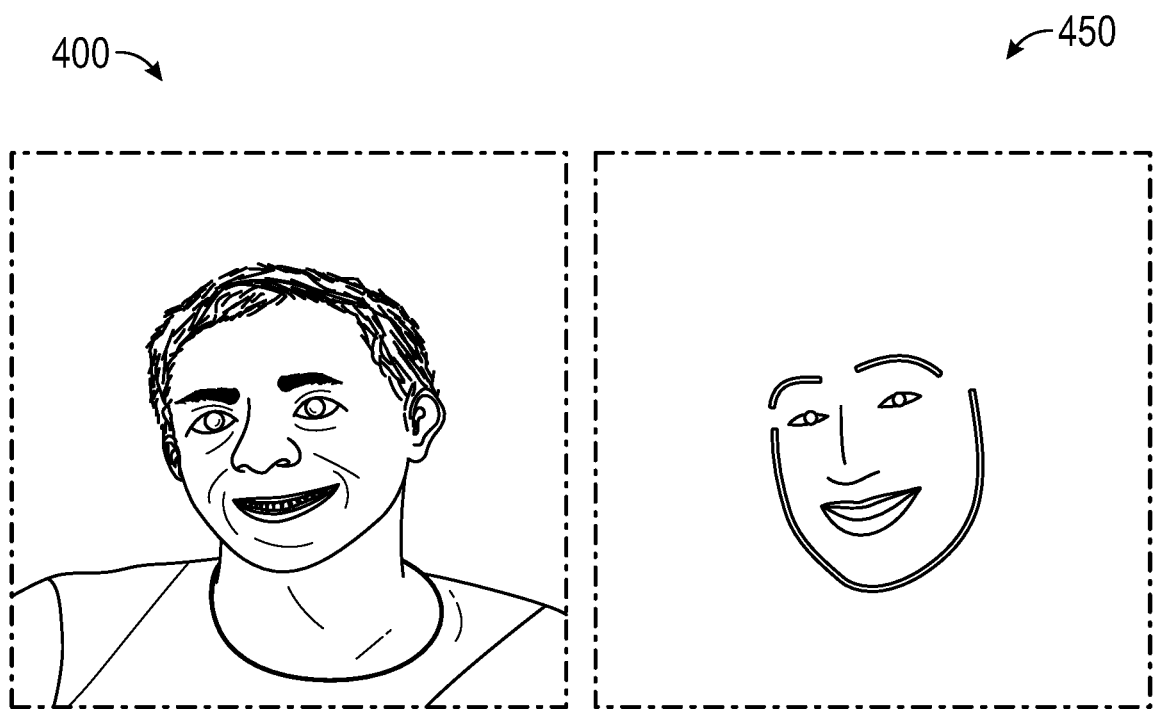
FIG. 4 shows an image of a face of a source actor and key points of the face, according to an example embodiment.
Figure 5:
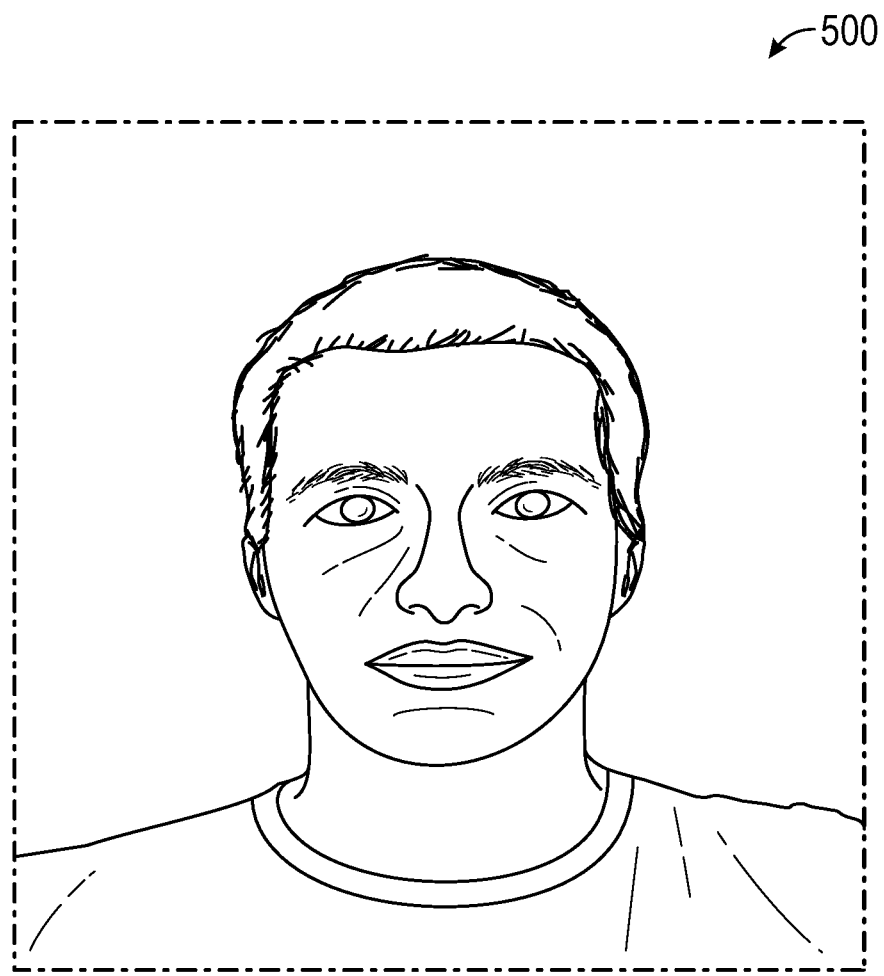
FIG. 5 shows an image of a target actor, in accordance with an example embodiment.
Figure 6:
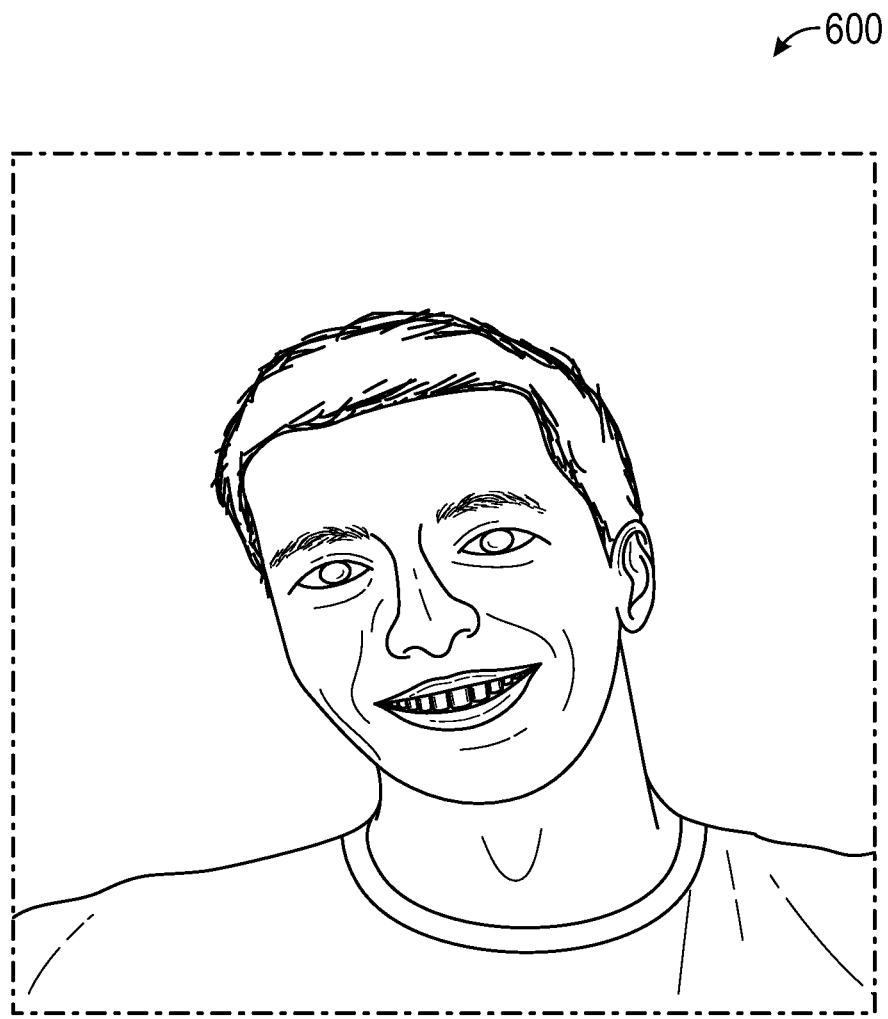
FIG. 6 shows an image of a face of a target actor, according to an example embodiment.

Example: An image of a face of a source actor (shown in FIG. 4, left image 400) is processed to extract key points (shown in FIG. 4, right image 450). FIG. 5 depicts an image 500 of a target actor which is fed into an Embedder network to receive embedding. Extracted key points and embedding are used as inputs to a Generator, which outputs an image of a face 600 of the target actor (shown in FIG. 6) that expresses the same emotions as the source actor (FIG. 4, left).

FIG. 7 is a block diagram showing steps performed by the system 220 during the training stage. To train the model, a dataset is needed with photos or videos of speaking humans where at least two photos (or video frames) exists for each speaker.

Step by step explanation of the training stage assumes a batch size equal to 1. It can be obviously generalized to bigger batches. At step 1, we take N (N>=2) random photos of input actor and pre-process them in the same way as in an inference stage. Step 2 includes calculation of pose encoding using first photo. Step 3 includes calculation of identity embedding using all other photos. At step 4, outputs of steps 2 and 3 are passed to a Generator, which generates an image that must be as similar as possible to the first photo. At step 5, the first photo is considered as ground truth in training procedure. Together with the generated image, the first photo is passed to a loss calculation block that estimates loss value on the current step. At step 6, loss calculated on the previous step is being minimized during the training step. At optional step 7, if the training dataset consists only of separate photos but not videos, an additional step of training is performed aimed to force the network to generate coherent frames in the course of generating a video.

Strictly speaking, the entire system is not being trained. Trainable weights are located in the Embedder, Generator, and, possibly, in the loss calculation block.

Figure 8:
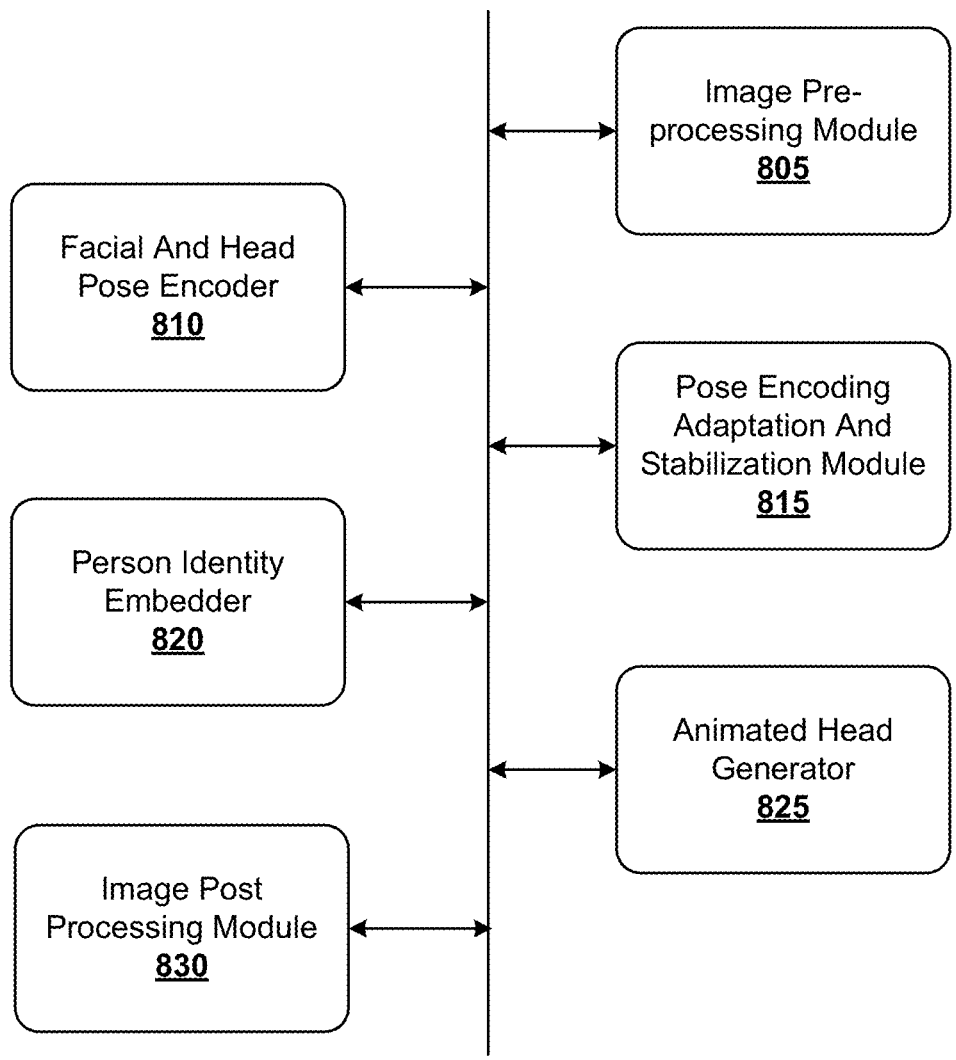
FIG. 8 is a block diagram of a system for realistic head turns and face animation synthesis, according to one example embodiment.

FIG. 8 is a block diagram of system 220 for realistic head turns and face animation synthesis, according to one example embodiment. The system 220 for realistic head turns and face animation synthesis can include an image pre-processing module 805, a facial and head pose encoder 810, a pose encoding adaptation and stabilization module 815, a person identity embedder 820, and an animated head generator 825. The modules 805-825 can be implemented as software components for use with hardware devices such as computing device 110, a server, and the like.

Image pre-processing module 805 may take input images and apply rescaling, cropping, segmentation and any other operation to them that does not change semantics of the input images. In an example embodiment, the image may be cropped in the way that a head of a person is located in the center of the image and then background pixels may be replaced with a predetermined constant value. Thereby, a model may to focus on the person from the input image and ignore unnecessary details. A separate semantic segmentation NN model may be used to classify pixels in two classes: background and person.

Figure 10:
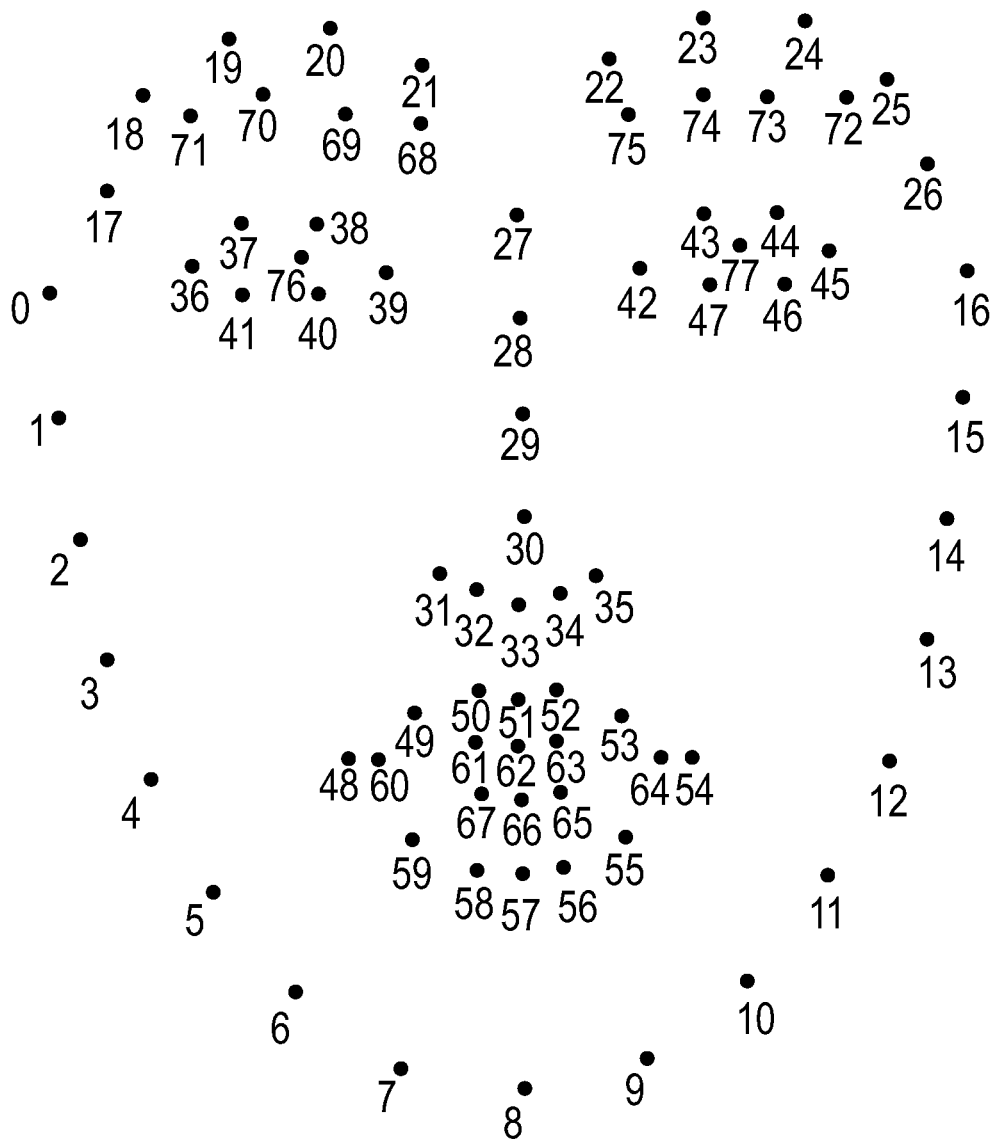
FIG. 10 is an image of a set of facial key points, according to an example embodiment.
Figure 11:
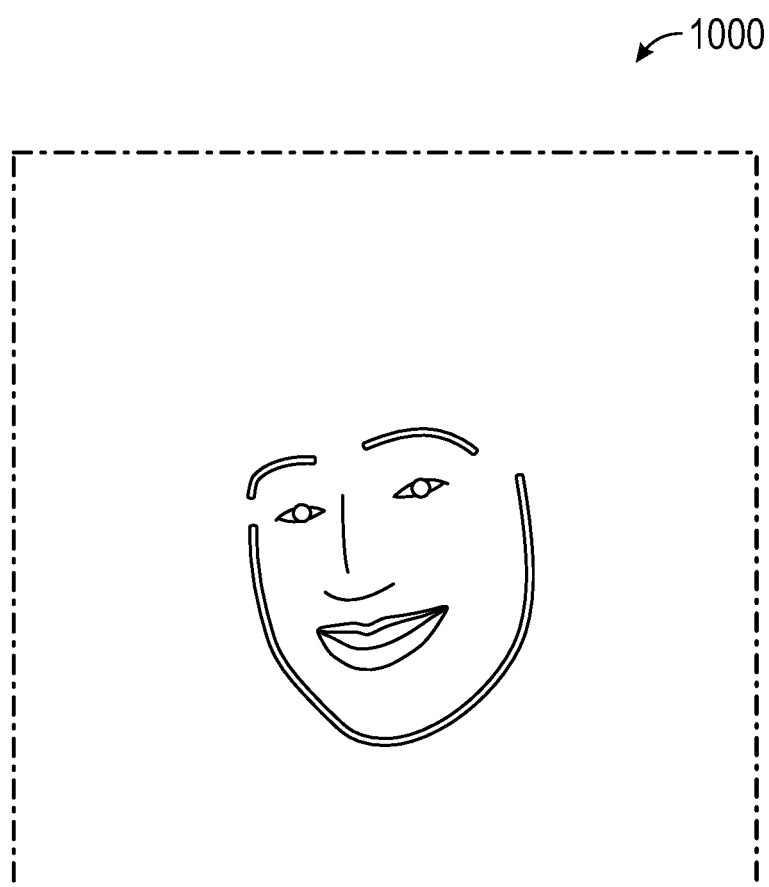
FIG. 11 shows a mask of facial key points, according to an example embodiment.

Facial and head pose encoder 810 takes a photo of an actor and outputs some pose encoding, for example, as a sequence of facial key points at each frame or a sequence of parameters of some parametric facial expression model. In an example embodiment, a set of 78 facial key points is used (see FIG. 10), but any set of facial key points may be used. The key points are 2D points that describe particular facial points (like a corner of a brow). A three-channel mask of facial key points (see FIG. 11) is used for each frame. More specifically, key points are extracted at each frame of the source video, then some bounding box (fixed width and height in pixels) of source actor's head is fixed and these dimensions are used to draw key points mask inside. In addition to the 2D facial landmarks (represented as an RGB image), the pose can be encoded with facial landmarks represented as contours on a separate channel of multidimensional image, represented as a heatmap (each point represented by 2D Gaussian), RGB projected normalized coordinate code (PNCC), rendered as an RGB image as a coarse approximation via 3DMM, by segmentation masks representing face parts (hair, face, upper body), depth map, and 3D facial landmarks. A head view and facial expression can be encoded separately by using angles (yaw, pitch, raw) for the head view and action units (AU) for the facial expression.

Pose encoding adaptation and stabilization module 815 performs pose encoding and stabilization. Pose encoding may contain not only emotions and head orientation, but also some identity information (like distance between eyes, width of mouth, etc.), which the system may not want to transfer. To fix this, the pose encoding adaptation is performed, which replaces identity information in encoding from the source actor to the target actor. In an example embodiment, this is performed by fitting a 3DMM to facial landmarks of the source actor and replacing identity parameters of the source actor with identity parameters of the target actor. After that, key points of the source actor are projected back to 2D. It is also possible to train an NN to replace identity information directly in 2D. The NN can be trained on synthetic data generated with a 3DMM. One of the types of NNs suitable for this task can be a U-net like architecture with 2D landmarks (represented as a heatmap) taken as input and producing 2D landmarks (represented as a heatmap) as output, which can be decoded to the original 2D landmarks representation.

The pose encoding adaptation can be performed in several ways. One of the possible approaches is called deformation transfer. Using this approach, a neutral frame for a target video and a source video can be provided. For all frames, a mesh can be built based on key points. The deformation transfer can apply the deformation exhibited by a source triangle mesh on a current frame onto a neutral source triangle mesh. The transformation of the source video can be defined as a set of affine transformation for each triangle in the source mesh $S_1, \ldots S_K$, where K is the number of the triangles in the mesh. For each frame, the affine transformation of triangles in the target mesh $T_1, \ldots T_K$ can be computed. The transformation that minimizes the sum of Frobenius norms of $S_i-T_i$ can be performed as well. Additionally, if two triangles have a common vertex, the affine transformation performs the transformation at the same position.

Since not only separate images but the whole video is intended to be generated, temporal coherency of pose encoding between separate frames needs to be enforced. In an example embodiment, this is performed by averaging each landmark coordinate using a slide window.

Person identity embedder 820 takes a set of photos with a head of the target actor (only one photo, or all frames from a video with talking target actor) and produces real valued embedding to pass to the generator.

A convolutional NN is used to take one three-channel photo of the head of the target actor and produce a one-dimensional real-valued embedding. The embedding can be applied to each available photo of target actor. A final embedding is computed by averaging all embeddings for each frame.

The animated head generator 825 ("Generator") may receive identity embedding and pose encoding as an input. The animated head generator may generate a frame sequence of a realistic and plausible-looking head of the target actor, which moves and express emotions that were extracted from the source actor. In an example embodiment, each frame is generated independently. A convolutional NN is used to output one three-channel photo. This approach can be modified to generate frames so that the next frame takes into account the previously generated one. It can be done, e.g., by passing previously generated frames on each step to an animated head generator 825. Alternatively, a ConvLSTM/ConvGRU may be utilized to generate a video in an RNN fashion. In addition, animated head generator 825 may have coarse-to-fine architecture so that it can generate more realistic high resolution images, which means that animated head generator 825 may have multiple intermediate outputs, each of which trained to generate necessary images but in low resolution.

Any object with key points can be animated using the system of the present disclosure. In general, some parts of the face can be harder to generate because they are more detailed, for example, eyes and a mouth. The overall image quality can be improved if the eyes and mouth are generated independently from the rest of the face. Using facial landmarks information, these parts of the face can be extracted from the frames of the source video. Generations of the eyes and mouth apart from the rest of the face does not necessitate any changes in the network architecture and the same model can be used. After the eyes and mouth are generated independently in high resolution, the eyes and mouth can be blended back into the face using facial landmarks.

To train a model, up to three loss functions are used jointly.

a) A first function is a so-called "perceptual" loss function. It requires multiple networks that were pre-trained to do some predictions based on images. It is expected that such networks are already capable of extracting real-valued high-level features from input images. The features are calculated for generated and ground truth samples and then some regression loss between them is calculated.

b) A second loss is adversarial. It also requires one additional network, but contrary to networks in perceptual loss function, the additional network does not need to be pre-trained. An NN called "Discriminator" is trained jointly with the main networks, in the pipeline described above. The Discriminator trains to distinguish generated and ground truth samples. Adversarial loss itself enforces "Generator" network to try to fool "Discriminator."

The "Discriminator" and "Generator" play a two-player game which results in generated samples to become non-distinguishable from real samples.

c) A third loss is also adversarial. The previous loss was aimed to enforce a plausibility of each generated frame separately. However, the final goal is to generate a video which is a sequence of frames. Such generated frames are enforced to be coherent with each other. To do this, a so-called "conditional video discriminator" is used. It takes multiple consequental video frames from real and generated videos as an input and trains to distinguish real videos from fake ones.

The final loss function of the system is calculated as a weighted sum of "perceptual" and both adversarial losses.

A basic loss function can be replaced by a more advanced loss function. The loss function can be described by formulas:

$$G_{loss} = \frac{1}{2} E[(D(G(e,c),c)-1)^2],$$

$$D_{loss} = \frac{1}{2} E[(D(x,c)-1)^2] + \frac{1}{2} E[(D(G(e,c),c))^2]$$

where $G_{loss}$ is a generator loss and $D_{loss}$ is a discriminator loss, x is a generated image, and c is facial landmarks of an image on which the generated image is conditioned, and e is embedding of a target actor.

If there are no videos in training data, "Conditional video discriminator loss" cannot be used, but a coherence in frames generation is still needed. So, in such a condition, the next step of the training is performed when one more loss is added to losses from a previous paragraph. Pose encoding and corresponding generated frames are taken and pose encoding is slightly changed with some random noise, and then a frame for this pose encoding is generated. After that, a difference between generated frames is generated and further treated as a loss.

Figure 9:
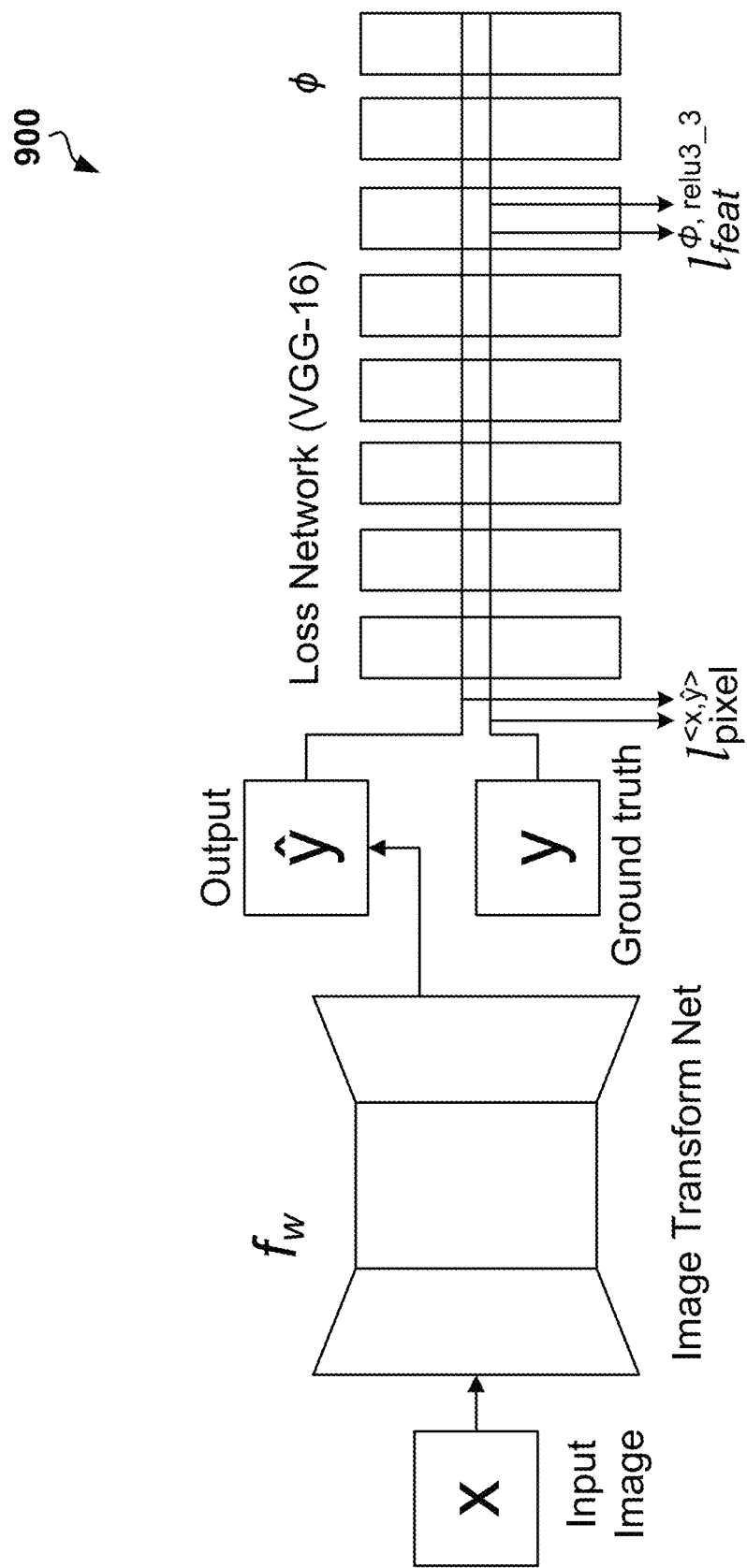
FIG. 9 is a flow chart showing a process for generating a loss during training a neural network for generation of images.

FIG. 9 is a flow chart showing a process 900 for generating a loss during training a neural network for generation of images. In some steps of the training, a masked loss can be used, i.e., absolute difference between generated and ground truth images computed only in an area of interest represented by a mask obtained by a pretrained segmentation model.

Perceptual loss where y is a collection of features extracted by the pretrained network (e.g., such as a pre-trained Convolutional Neural Network VGG-16 shown in FIG. 9) from the ground truth image and ŷ is a collection of features extracted by the pretrained network from the generated image can be determined by the following formula:

$$\text{Loss}_{per} = E\left[\sum_{i=1}^{n} w_i l_{feat}(y_i, \hat{y}_i)\right]$$

Adversarial loss where x is the generated image and c is data used for conditioning, i.e., facial key points, and so forth, can be determined by the following formulas:

$$D_{loss} = -E[\log(D(x,c) + \log(1-D(G(c),c))]$$

$$G_{loss} = E[\log(1-D(G(c),C))]$$

The resulting loss is a weighted sum of the perceptual loss, adversarial loss, and adversarial loss for sequence of frames:

$$\text{Loss} = \text{Loss}_{per} + \alpha_{adv} \text{Loss}_{adv} + \alpha_{adv\_seq} \text{Loss}_{adv\_seq}$$

Referring back to FIG. 8, the image postprocessing module 830 can be used to generate realistic head turns conditioned on the source video. Each frame of the source video can be cropped based on facial landmark positions. The cropping can be performed in such a way that the face appears exactly at the center of the image. The image can be then passed to the neural network. This step allows fitting the whole face into the frame. This transformation of the frames of the source video into the input for the neural network is also referred to herein as an affine transformation. The reverse affine transformation can be applied to the output provided by the neural network. The step of the reverse transformation can solve the problem of the head having a different scale in different frames. The problem with different scale may occur because the cropping is computed for each frame independently.

Figure 12:
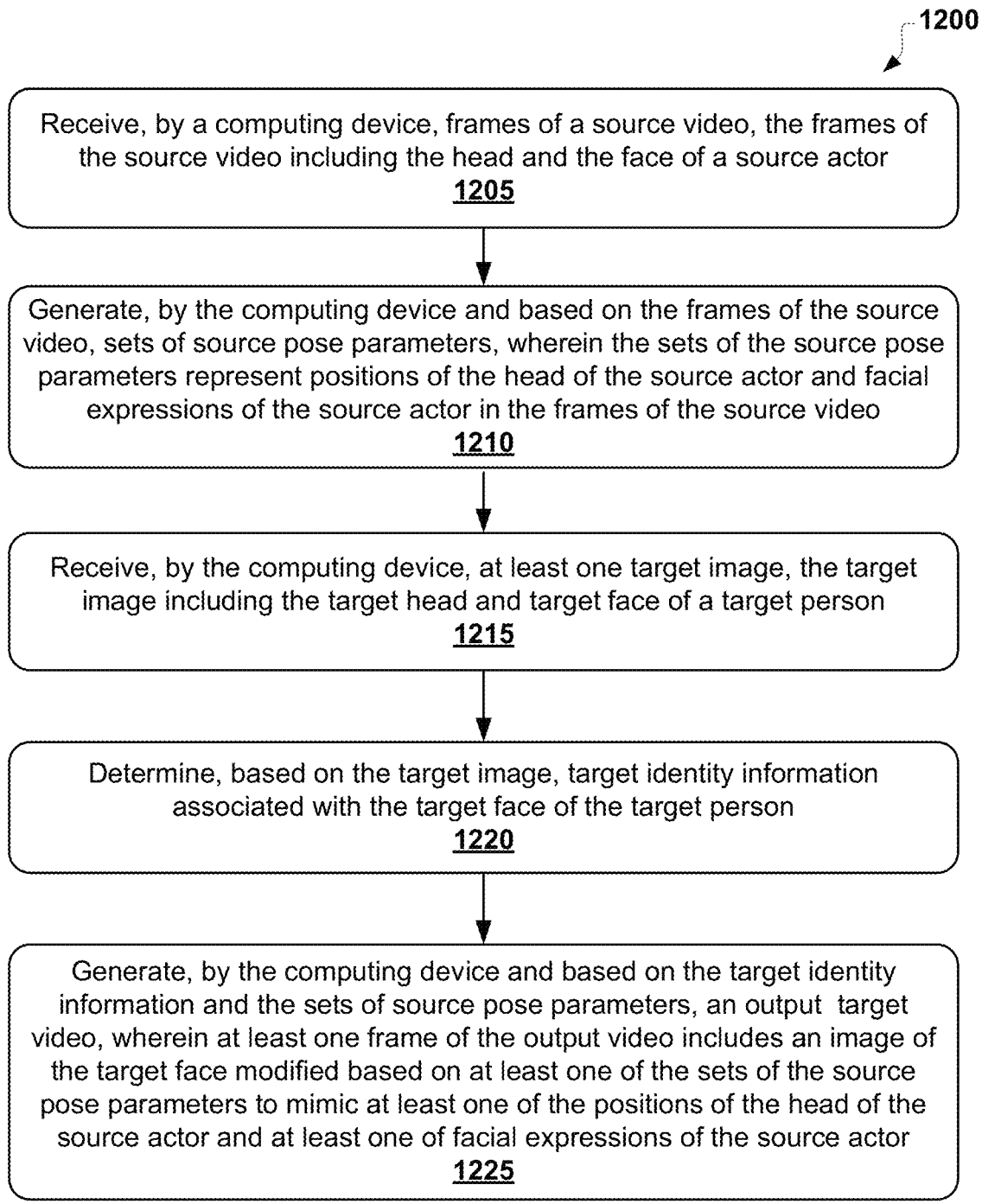
FIG. 12 is a flow chart showing a method for realistic head turns and face animation synthesis, according to an example embodiment.

FIG. 12 is a flow chart showing a method 1200 for realistic head turns and face animation synthesis, according to an example embodiment. The method 1200 can be performed by computing device 110. The method 1200 may include receiving, by a computing device, a source video and frames of a source video at operation 1205. The frames of the source video may include a head and a face of a source actor. The method 1200 may further include generating sets of source pose parameters at operation 1210. The sets of source key points may be generated by the computing device based on the frames of the source video. The sets of the source pose parameters may represent positions of the head of the source actor and facial expressions of the source actor in the frames of the source video. The method 1200 may further include the computing device receiving a target image at operation 1215. The target image may include a target head and a target face of a target person. The target person may be different from the source actor. The method 1200 may further include generating an output video at operation 1220. The target video may be generated by the computing device based on the target image and the sets of source pose parameters. At least one frame of the output video may include an image of the target face modified based on at least one of the sets of the source pose parameters to mimic at least one of the positions of the head of the source actor and at least one of facial expressions of the source actor.

Figure 13:
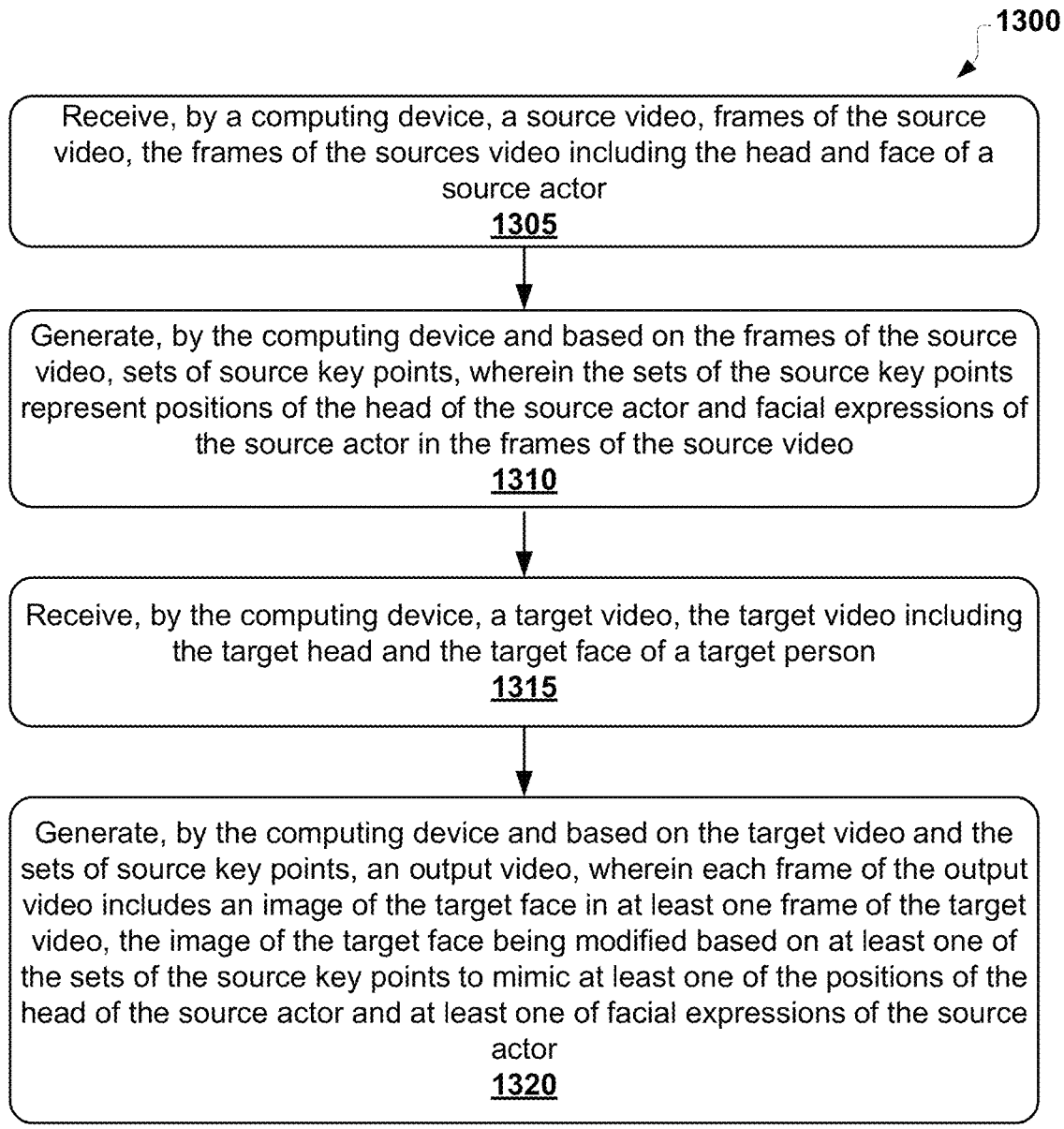
FIG. 13 is a flow chart showing a method for realistic head turns and face animation synthesis, according to an example embodiment.

FIG. 13 is a flow chart showing a method 1300 for realistic head turns and face animation synthesis, according to an example embodiment. The method 1300 can be performed by computing device 110. The method 1300 may include receiving, by a computing device, a source video and frames of a source video at operation 1305. The frames of the source video may include a head and a face of a source actor. The method 1300 may further include generating sets of source key points at operation 1310. The sets of source key points may be generated by the computing device based on the frames of the source video. The sets of the source key points may represent positions of the head of the source actor and facial expressions of the source actor in the frames of the source video. The method 1300 may further include the computing device receiving a target video at operation 1315. The target video may include a target head and a target face of a target person. The target person may be different from the source actor. The method 1300 may further include the computing device generating an output video at operation 1320 based on the target video and the sets of source key points. Each frame of the output video may include an image of the target face. The image of the target face may be modified based on at least one of the sets of the source key points to mimic at least one of the positions of the head of the source actor and at least one of facial expressions of the source actor.

Figure 14:
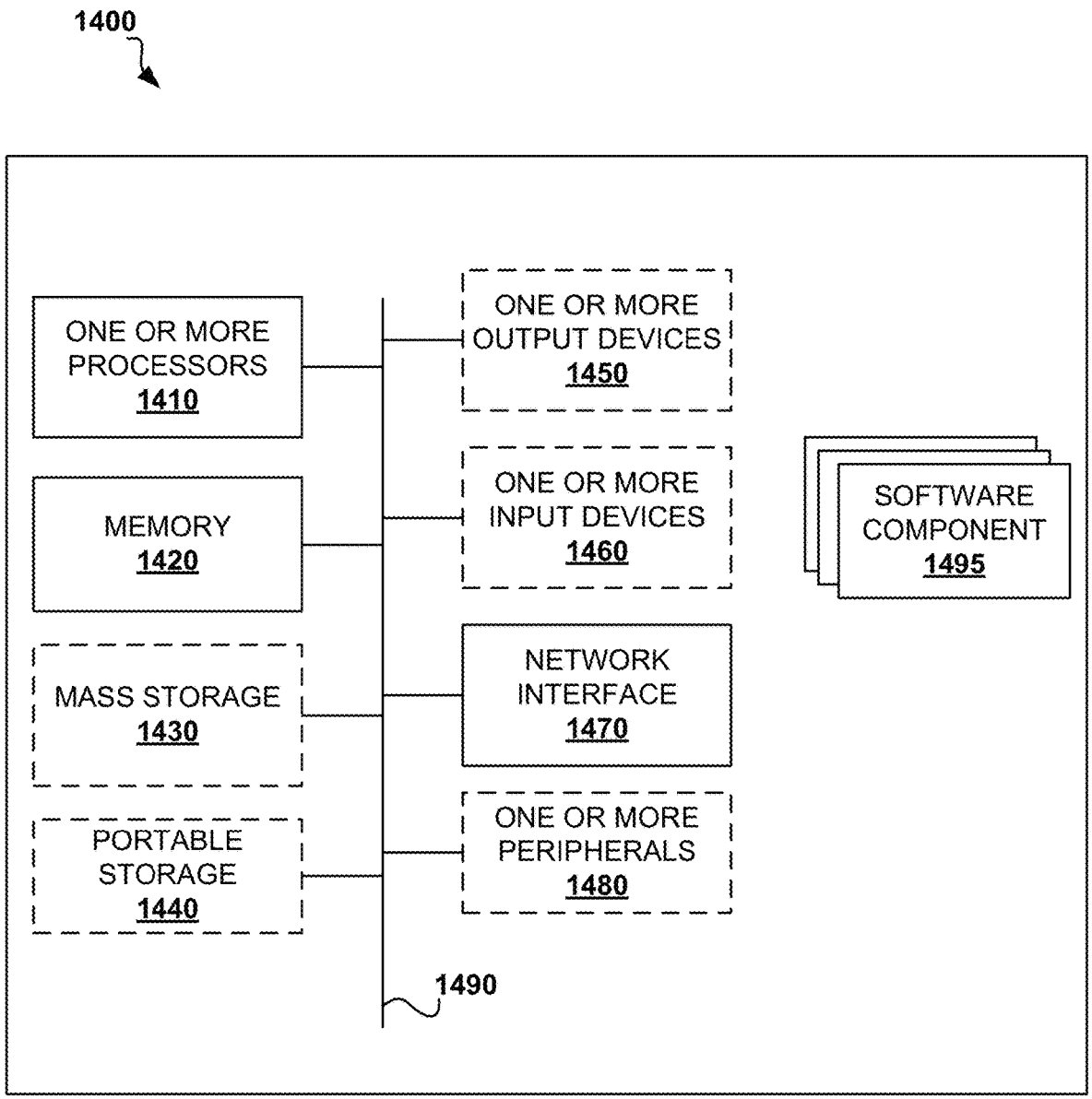
FIG. 14 shows an example computer system that can be used to implement the methods for realistic head turns and face animation synthesis.

FIG. 14 illustrates an example computing system 1400 that may be used to implement methods described herein. The computing system 1400 may be implemented in the contexts of the likes of the computing device 110, the system 220, an image pre-processing module 805, a facial and head pose encoder 810, a pose encoding adaptation and stabilization module 815, a person identity embedder 820, an animated head generator 825, and an image post processing module 830.

As shown in FIG. 14, the hardware components of the computing system 1400 may include one or more processors 1410 and memory 1420. Memory 1420 stores, in part, instructions and data for execution by processor 1410. Memory 1420 can store the executable code when the system 1400 is in operation. The system 1400 may further include an optional mass storage device 1430, optional portable storage medium drive(s) 1440, one or more optional output devices 1450, one or more optional input devices 1460, a network interface 1470, and one or more optional peripheral devices 1480. The computing system 1400 can also include one or more software components 1495 (e.g., ones that can implement the method for realistic head turns and face animation synthesis as described herein).

The components shown in FIG. 14 are depicted as being connected via a single bus 1490. The components may be connected through one or more data transport means or data networks. The processor 1410 and memory 1420 may be connected via a local microprocessor bus, and the mass storage device 1430, peripheral device(s) 1480, portable storage device 1440, and network interface 1470 may be connected via one or more input/output (I/O) buses.

The mass storage device 1430, which may be implemented with a magnetic disk drive, solid-state disk drive, or an optical disk drive, is a non-volatile storage device for storing data and instructions for use by the processor 1410. Mass storage device 1430 can store the system software (e.g., software components 1495) for implementing embodiments described herein.

Portable storage medium drive(s) 1440 operates in conjunction with a portable non-volatile storage medium, such as a compact disk (CD) or digital video disc (DVD), to input and output data and code to and from the computing system 1400. The system software (e.g., software components 1495) for implementing embodiments described herein may be stored on such a portable medium and input to the computing system 1400 via the portable storage medium drive(s) 1440.

The optional input devices 1460 provide a portion of a user interface. The input devices 1460 may include an alphanumeric keypad, such as a keyboard, for inputting alphanumeric and other information, or a pointing device, such as a mouse, a trackball, a stylus, or cursor direction keys. The input devices 1460 can also include a camera or scanner. Additionally, the system 1400 as shown in FIG. 14 includes optional output devices 1450. Suitable output devices include speakers, printers, network interfaces, and monitors.

The network interface 1470 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1470 may be a network interface card, such as an Ethernet card, optical transceiver, radio frequency transceiver, or any other type of device that can send and receive information. The optional peripherals 1480 may include any type of computer support device to add additional functionality to the computer system.

The components contained in the computing system 1400 are intended to represent a broad category of computer components. Thus, the computing system 1400 can be a server, personal computer, hand-held computing device, telephone, mobile computing device, workstation, minicomputer, mainframe computer, network node, or any other computing device. The computing system 1400 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with this disclosure. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for realistic head turns and face animation synthesis have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for realistic head turns and face animation synthesis, the method comprising:
    receiving, by a computing device, frames of a source video, the frames of the sources video including a head and a face of a source actor;
    generating, by the computing device and based on the frames of the source video, sets of source pose parameters, wherein the sets of the source pose parameters correspond to positions of the head of the source actor and facial expressions of the source actor in the frames of the source video, the source pose parameters including source identity information associated with the face of the source actor;
    receiving, by the computing device, at least one target image, the at least one target image including a target head and a target face of a target person;
    determining, based on the at least one target image, target identity information associated with the target face of the target person, wherein the determining the target identity information includes providing the at least one target image to a neural network, the neural network being configured to output a real value vector including the target identity information;
    determining, based on the source pose parameters, that a portion of the source identity information is undesirable in the target face;
    based on the determination, replacing, by a further neural network, the portion of the source identity information in the sets of the source pose parameters with the target identity information to generate further sets of further source pose parameters; and
    generating, by the computing device and based on the target identity information and the further sets of the further source pose parameters, an output video, wherein each frame of the output video includes an image of the target face in at least one frame of the output video, the image of the target face being modified based on at least one of the sets of the source pose parameters to mimic at least one of the positions of the head of the source actor and at least one of the facial expressions of the source actor.

2. The method of claim 1, wherein the target person is different from the source actor.

3. The method of claim 1, wherein the source pose parameters include at least one of: source key points corresponding to coordinates of facial landmarks of the source actor and parameters of a parametric facial expression model.

4. The method of claim 1, further comprises, prior to the generating the output video, averaging the source pose parameters representing the facial expressions in a pre-determined number of neighboring frames of the source video.

5. The method of claim 1, wherein the generating the output video includes providing the target identity information and the sets of the source pose parameters to a neural network configured to generate frames of the output video.

6. The method of claim 1, wherein each frame of the output video is generated independently from the rest of the frames of the output video.

7. The method of claim 1, wherein at least one frame of the output video is generated based on information extracted from at least one previously generated frame of the output video.

8. The method of claim 1, further comprising:
    prior to generating the output video:
        cropping, based on the source pose parameters, at least one frame of the source video to obtain a further frame;
        determining an affine transformation for transforming the at least one frame to the further frame; and
    after the generating the output video:
        applying to a frame of the output video corresponding to the at least one frame of the source video, a further affine transformation, the further affine transformation being an inverse of the affine transformation.

9. A system for realistic head turns and face animation synthesis, the system comprising at least one processor and a memory storing processor executable codes, wherein the at least one processor is configured to implement the following operations upon executing the processor-executable codes:
    receiving, by a computing device, frames of a source video, the frames of the sources video including a head and a face of a source actor;
    generating, by the computing device and based on the frames of the source video, sets of source pose parameters, wherein the sets of the source pose parameters correspond to positions of the head of the source actor and facial expressions of the source actor in the frames of the source video, the source pose parameters including source identity information associated with the face of the source actor;
    receiving, by the computing device, at least one target image, the at least one target image including a target head and a target face of a target person;
    determining, based on the at least one target image, target identity information associated with the target face of the target person, wherein the determining the target identity information includes providing the at least one target image to a neural network, the neural network being configured to output a real value vector including the target identity information;
    determining, based on the source pose parameters, that a portion of the source identity information is undesirable in the target face;
    based on the determination, replacing, by a further neural network, the portion of the source identity information in the sets of the source pose parameters with the target identity information to generate further sets of further source pose; and
    generating, by the computing device and based on the target identity information and the further sets of the further source pose parameters, an output video, wherein each frame of the output video includes an image of the target face in at least one frame of the output video, the image of the target face being modified based on at least one of the further sets of the further source pose parameters to mimic at least one of the positions of the head of the source actor and at least one of the facial expressions of the source actor.

10. The system of claim 9, wherein the target person is different from the source actor.

11. The system of claim 9, wherein the source pose parameters include at least one of: source key points corresponding to coordinates of facial landmarks of the source actor and parameters of a parametric facial expression model.

12. The system of claim 9, further comprises, prior to the generating the output video, averaging the source pose parameters representing the facial expressions in a predetermined number of neighboring frames of the source video.

13. The system of claim 9, wherein the generating the output video includes providing the target identity information and the sets of the source pose parameters to a neural network configured to generate frames of the output video.

14. The system of claim 9, wherein each frame of the output video is generated independently from the rest of the frames of the output video.

15. The system of claim 9, wherein at least one frame of the output video is generated based on information extracted from at least one previously generated frame of the output video.

16. A non-transitory processor-readable medium having instructions stored thereon, which when executed by one or more processors, cause the one or more processors to implement a method for realistic head turns and face animation synthesis, the method comprising:

receiving, by a computing device, frames of a source video, the frames of the sources video including a head and a face of a source actor;

generating, by the computing device and based on the frames of the source video, sets of source pose parameters, wherein the sets of the source pose parameters correspond to positions of the head of the source actor and facial expressions of the source actor in the frames of the source video, the source pose parameters including source identity information associated with the face of the source actor;

receiving, by the computing device, at least one target image, the at least one target image including a target head and a target face of a target person;

determining, based on the at least one target image, target identity information associated with the target face of the target person, wherein the determining the target identity information includes providing the at least one target image to a neural network, the neural network being configured to output a real value vector including the target identity information;

determining, based on the source pose parameters, that a portion of the source identity information is undesirable in the target face;

based on the determination, replacing, by a further neural network, the portion of the source identity information in the sets of the source pose parameters with the target identity information to generate further sets of further source pose parameters; and generating, by the computing device and based on the target identity information and the further sets of the further source pose parameters, an output video, wherein each frame of the output video includes an image of the target face in at least one frame of the output video, the image of the target face being modified based on at least one of the further sets of the further source pose parameters to mimic at least one of the positions of the head of the source actor and at least one of the facial expressions of the source actor.

* * * * *